G. WILKINSON.
SYSTEM OF PURIFYING FEED WATER.
APPLICATION FILED JAN. 4, 1910.
977,578.
Patented Dec. 6, 1910.
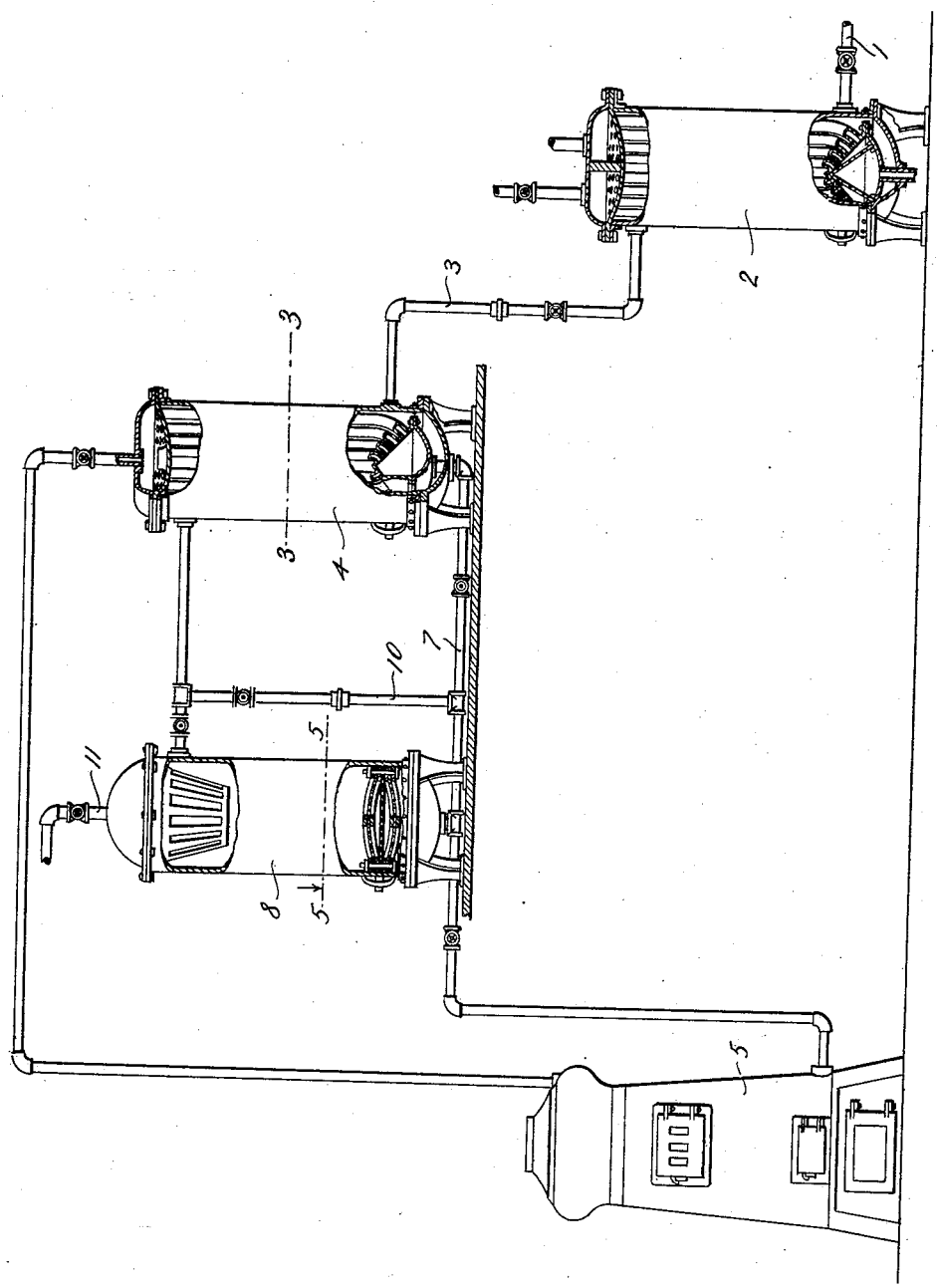
Witnesses
E. Larson
Charles Albetzog
Inventor
George Wilkinson
By Delbert Robb
Attorneys

UNITED STATES PATENT OFFICE.

GEORGE WILKINSON, OF PHILADELPHIA, PENNSYLVANIA, ASSIGNOR TO WILKINSON WATER PURIFYING COMPANY, A CORPORATION OF DELAWARE.

SYSTEM OF PURIFYING FEED-WATER.

977,578. Specification of Letters Patent. Patented Dec. 6, 1910.

Application filed January 4, 1910. Serial No. 536,254.

*To all whom it may concern:*

Be it known that I, GEORGE WILKINSON, a citizen of the United States, residing at Philadelphia, in the county of Philadelphia and State of Pennsylvania, have invented certain new and useful Improvements in Systems of Purifying Feed-Water, of which the following is a specification.

This invention relates to treatment of feed water by mechanical means for the purpose of removing or separating therefrom all mud, sand, iron, lime, magnesia, and vegetable and organic matter by which steam boilers are likely to become injured by the formation of scale.

The invention consists of a system of water purification avoiding the use of chemicals in any way, the main principle of operation depended upon to accomplish the passing of the feed water through a primary or feed water heater, which raises the temperature thereof to 200 or 212 degrees F., after which it is passed through a precipitator wherein live steam from the boiler is used to raise the temperature of the water to the precipitating point required to throw down foreign and injurious substances held by the water in solution.

By the practice of the present system of treatment of feed water the efficiency of the boiler is increased materially, absolutely no damage is done to the boiler since the feed water reaches the boiler as clear as distilled water, and a large saving of fuel is accomplished.

For a full understanding of the invention reference is to be had to the following detail description and to the accompanying drawings, in which—

Figure 1 is a side elevation showing an apparatus such as is used in the operation of a system or process in accordance with the present invention, certain parts of the apparatus being broken away to show them in section and illustrate the interior construction.

Throughout the following detail description and on the several figures of the drawings, similar parts are referred to by like reference characters.

In the operation of my system it is intended that the feed water which is supplied from any suitable supply means, as for instance a pipe 1, shall pass through an ordinary exhaust tubular heater 2 in which the feed water is brought to the temperature of about 210 to 212 degrees F. From the heater 2 the feed water passes through a suitable pipe 3 into a precipitator 4 wherein the solids held in the solution in the water are precipitated. The precipitator 4 is a heater into which live steam from the boiler 5 is fed through a pipe 6, said steam passing into the heater 4 at the top and out of the heater at its base into a feed water pipe 7. After the live steam from the boiler 5 has been used in the precipitator 4 it is returned to the boiler, as above mentioned, and through the pipe 7 so that a circulation is established through the apparatus above described, the temperature being equalized, and there being the same pressure on the precipitator and the adjacent separator 8 as there is in the boiler. The feed water after being heated in the precipitator to the high temperature before mentioned passes from the precipitator through a pipe 9 into the upper part of the separator 8 before referred to. In the separator 8 all solids precipitated in the precipitator 4 are separated from the feed water so that the latter is rendered free from such solids and all impurities of whatever nature contained therein before. From the separator 8 the feed water passes into the pipe 7 and from this into the lower part of the boiler 5.

In the operation of the system of feed water treatment above described the greater part of condensation of cold water in the precipitator is eliminated and by raising the feed water from the temperature at which it leaves the exhaust heater 2 to the temperature of the water already in the boiler 5, I have found that a saving of fuel of at least 20% is effected, in addition to securing the desired purification of the water.

The pipes 7 and 9 are connected by a pipe 10 located between the precipitator 4 and separator 8 and said pipe 10 is valved so that it may be used for blowing-off purposes in an obvious manner. A suitable sediment blow-off pipe 11 is located at the top of the separator 8 and in the various pipes will be provided valves for controlling the passage of the water and steam in carrying out the process of water purification hereinbefore described.

It has been found by many chemical tests that have been made of the water treated by this system that it is positively free from all germs of disease and bacteria of every kind and is far superior for domestic purposes to any of the so called distilled waters that are so largely used in all cities and towns for domestic use.

Having thus fully described my invention, what is claimed as new is:

1. In a system of feed water treatment, an exhaust heater, a precipitator and a separator elevated above said exhaust heater, a boiler on a level with said precipitator, steam circulating devices connecting the precipitator and the boiler to convey live steam from the boiler to the precipitator and back to the boiler, a connection between said exhaust heater and said precipitator, and means whereby water may be conducted either from said precipitator or separator to the return live steam pipe.

2. In a system of feed water treatment, the combination with a boiler, of a precipitator, pipes connecting said precipitator to said boiler, said pipes adapted to conduct live steam to said precipitator and return the condensed steam to the boiler, an exhaust heater, a connection between said exhaust heater and the precipitator, and a separator connected with said return pipe and said precipitator.

3. In a system of feed water treatment, a boiler, a precipitator, steam circulating pipes connecting the precipitator and boiler to convey live steam from the boiler to the precipitator and back to the boiler, feed water supply means for supplying feed water to the precipitator, and means for conducting said water from the precipitator to the return live steam pipe through which said water is conveyed to the boiler.

4. In a system of feed water treatment, a boiler and precipitator, a plurality of pipes connecting said precipitator to said boiler, adapted to conduct live steam to said precipitator and return water of condensation to said boiler, an exhaust heater connected with said precipitator, a separator connected with said precipitator and said return pipe, and a by-pass extending from the connection between said separator and said precipitator to said return pipe.

In testimony whereof I affix my signature in presence of two witnesses.

GEORGE WILKINSON.

Witnesses:
MAHLON VAN BOOSKIRK,
S. A. LUTZ.